UNITED STATES PATENT OFFICE.

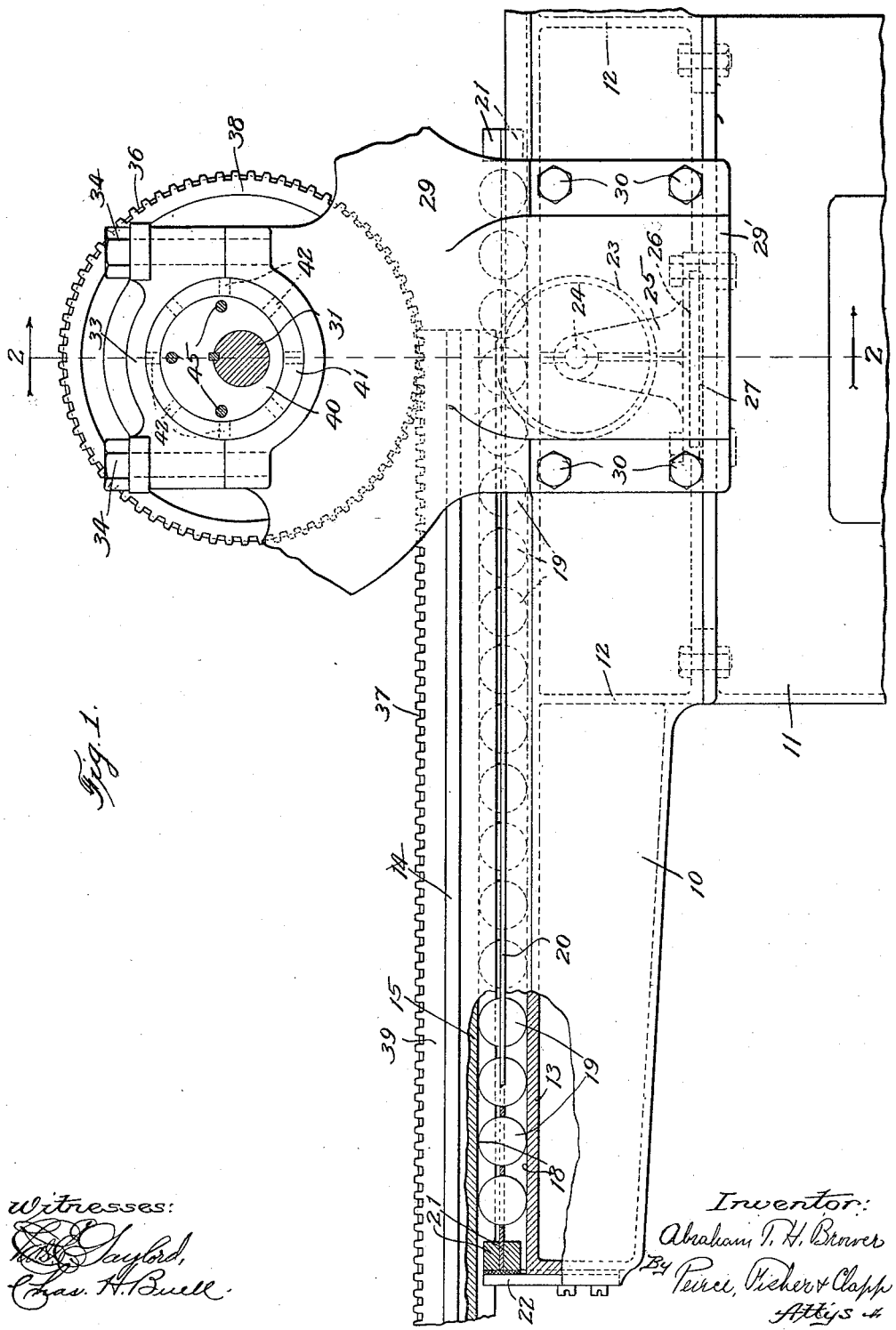

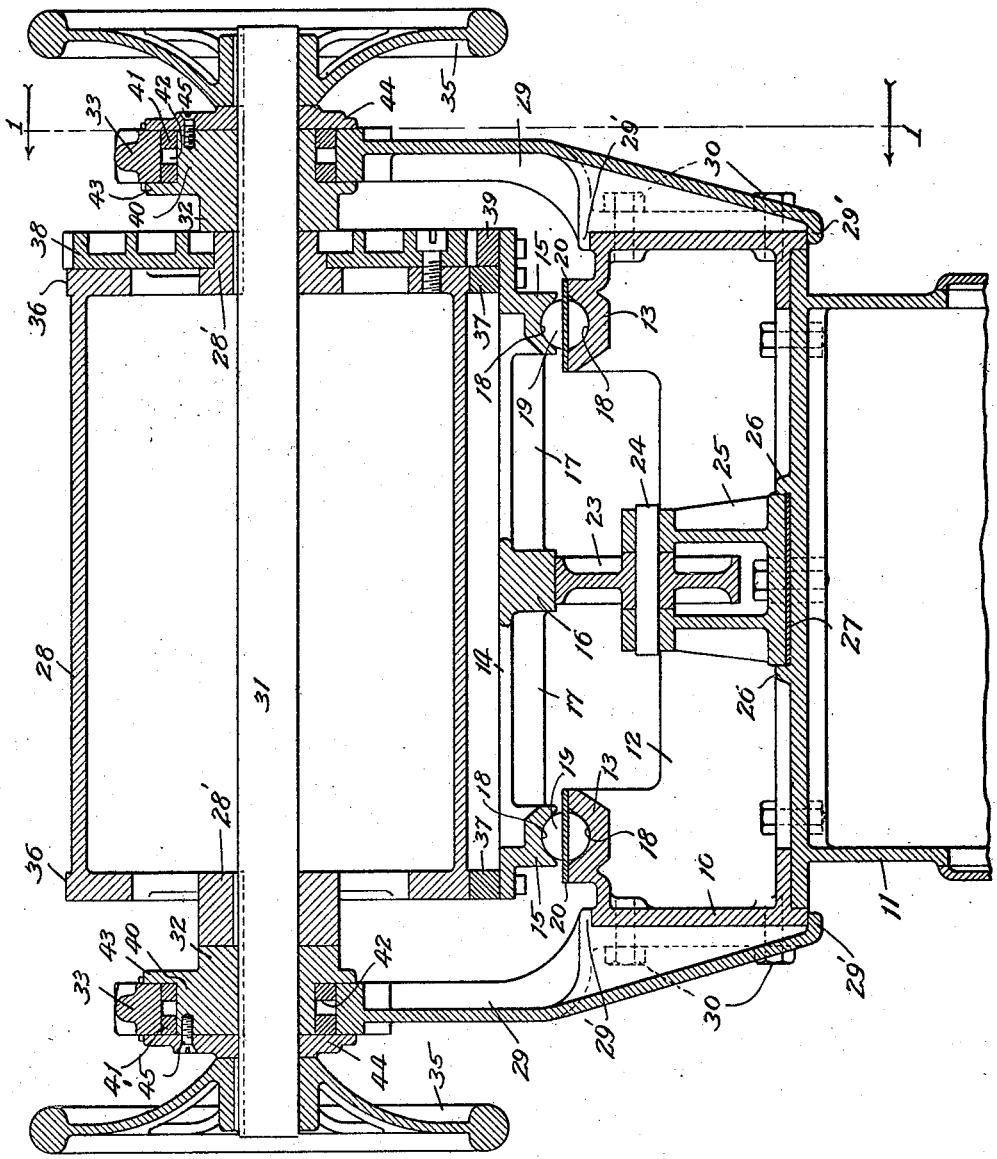

ABRAHAM T. H. BROWER, OF CHICAGO, ILLINOIS.

ROLLER-BEARING FOR PRINTING-PRESSES.

1,271,423.  Specification of Letters Patent.  Patented July 2, 1918.

Original application filed November 23, 1912, Serial No. 733,165. Divided and this application filed January 22, 1917. Serial No. 143,575.

*To all whom it may concern:*

Be it known that I, ABRAHAM T. H. BROWER, a citizen of the United States, and a resident of Chicago, county of Cook, and State of Illinois, have invented certain new and useful Improvements in Roller-Bearings for Printing-Presses, of which the following is a specification.

The present application is a division of an earlier application filed by me November 23, 1912, Serial No. 733,165, upon which United States Letters Patent No. 1,218,049, were granted March 6, 1917.

The present invention relates to roller bearings for bed and cylinder printing presses and seeks to provide improved means for supporting and guiding the reciprocating bed and for holding the same against lateral movement.

The invention consists in the features of improvements hereinafter set forth, illustrated in the preferred form in the accompanying drawings and more particularly pointed out in the appended claims.

In the drawings Figure 1 is a view in elevation of the improved printing press with parts broken away to illustrate the means for supporting and guiding the reciprocating bed. Fig. 2 is a vertical section on the line 2—2 of Fig. 1.

The horizontal frame 10 of the press is mounted on and is securely bolted to a suitable supporting standard or base 11. These parts are formed of cast iron and the frame 10 is strengthened at intervals by transverse webs 12. At its upper portion and at its opposite side edges the frame is provided with guides 13 for the reciprocating bed 14. The latter is provided on its under side with longitudinally extending guide ribs 15 near its edges and with a central, longitudinal, bearing rib 16, and also with transverse strengthening ribs 17. The frame and bed guides 13 and 15 are provided with grooves 18 for two sets of bearing balls 19. Each set of bearing balls is held in proper position by a spacer bar 20 which is provided with openings for the individual balls and which is arranged to slide upon the upper surfaces of the guide 13 on opposite sides of the groove 18 therein. The central portions of the guide grooves are cylindrical and are of the same radius as the bearing balls 19. These cylindrical central portions of the grooves preferably extend through arcs of about 90° and the upwardly flaring side walls of the grooves of the frame guides 13 and the downwardly flaring side walls of the grooves of the bed guides 15 are tangent to the central cylindrical portions thereof and to the bearing balls.

The ends of the spacer bars 20 are provided with stop blocks 21 which, at the ends of the movement of the bed, are arranged to engage stop pieces 22 (see Fig. 1) fixed to the ends of the frame 10, so that the sets of bearing balls are maintained in proper position relatively to the reciprocating type bed. Preferably, the stop pieces 22 are covered with raw hide, leather or the like.

To relieve the ball bearings in part from the pressure of the cylinder upon the bed, the central bearing rib 16 has a lower, flat, horizontal working face which is arranged to engage a supporting wheel or roller 23. This supporting wheel or roller is mounted upon a short cross-shaft 24 that is journaled at its ends in the upright side portions of a bracket 25. This bracket is bolted to the upper central portion of the base or standard 11 between a pair of ribs 26 thereon. Shims 27 are interposed between the upper part of the base and the bracket 25 to take up any play between the guiding and supporting wheel 23 and the longitudinal rib 16 of the bed.

The supporting and guiding wheel 23 is arranged in vertical alinement with the axis of the cylinder 28 which is supported above the bed by a pair of heavy brackets 29. The lower portions of the cylinder brackets overlap the outer faces of the frame 10 and are firmly secured thereto by upper and lower sets of bolts 30. Preferably, as shown in Fig. 2, the cylinder brackets are provided with lips 29' which overlap the upper and lower edges of the frame 10. The ends of the cast iron cylinder 28 are provided with hubs 28' which are keyed to a shaft 31. Each end of the shaft is journaled in a bush or bearing 32 and these bearings are arranged between the upper ends of the cylinder brackets and cap pieces 33 which are secured to the brackets by bolts 34. The projecting ends of the shaft are provided with hand-wheels 35 by which the cylinder may be rotated.

The surface of the cylinder is recessed as usual, throughout the greater portion of its length and at its ends is provided with bearing flanges 36 which engage upwardly projecting bearers 37 fixed to the opposite side edges of the bed 14. A gear wheel 38 fixed to one end of the cylinder meshes with a rack 39 fixed to one of the side edges of the bed to thereby effect the forward and backward movements of the latter as the cylinder is rotated in its opposite direction.

The shaft bearings 32 are provided with eccentric portions 40 which can be oscillated to thereby raise the cylinder upon the return or idle movement of the bed. These eccentrics are fitted within outer eccentrics 41 and the latter in turn are arranged in seats formed in the upper portion of the brackets 29 and in the bracket cap pieces 33. The outer eccentrics are shifted only when it is desired to adjust the cylinder to bring its tympan surface and the flanges 36 in proper relation to the type bed and the bearers 37 thereon. For convenience in adjusting the eccentrics 41 they are provided with a series of radial holes 42. These outer eccentrics can only be shifted by removing the cap pieces 33 and once they are properly set they are securely clamped in place and so held against movement by the cap pieces which, in turn, are held in position by the bolts 34. Each of the inner eccentrics or shaft bearings is provided with a flange 43 which overlaps the inner face of the outer eccentric and also abuts against the inner faces of the cylinder bracket 29 and the bracket cap 33. A plate 44 similar in size to the flange 44 overlaps the outer faces of these parts and is connected to the main body of the inner eccentric bearing by screws 45 to thereby hold the cylinder, cylinder shaft bearings and outer adjusting or take-up eccentrics in position.

The inner eccentric bearings are oscillated or tripped by suitable mechanism, such as set forth and claimed in the prior application referred to, to raise the cylinder during the idle or return movement of the bed. During the forward or working stroke of the bed the bearing flanges 36 of the cylinder engage the bearers 37 of the bed and hold the same firmly down upon the bearing balls 19 and bearing wheel or roller 23. The bearing balls and roller 23 thus sustain the weight of the bed and the pressure of the cylinder thereon, and the flaring side walls of the guide grooves 18 coöperate with the balls to center the bed and hold the same against lateral movement. By this arrangement the bed is accurately guided and held against lateral movement during its forward or working stroke and the necessity of employing side guides is obviated. By adjusting the eccentrics 41 from time to time, any wear or play of the bed guides, both in vertical or lateral directions, can be taken up.

It is obvious that numerous changes may be made in the details set forth without departure from the essentials of the invention as defined in the claims.

I claim as my invention:

1. The combination with a frame, of a reciprocating bed thereon, and sets of bearing balls interposed between said frame and bed, said parts having guide grooves forming race-ways for said sets of balls, and said grooves having cylindrical central portions of the same radius as said balls and flaring side portions tangent to said cylindrical portions and to said balls.

2. The combination with a frame, of a reciprocating bed thereon, said frame and bed having grooved guides, sets of bearing balls arranged in the grooves of said guides, spacer bars having openings for the individual balls slidably on said frame guides, and stops at the ends of said frame for said spacer bars, the grooves of said guides having cylindrical central portions of the same radius as said balls.

3. The combination with a frame, of a reciprocating bed thereon, said bed and frame having opposed grooves at their opposite side edges, two sets of bearing balls in said grooves, cylinder brackets fixed to said frame and a cylinder journaled in said brackets and engaging said bed, said grooves having central cylindrical portions and flaring side walls and coöperating with said balls to center said bed and hold the same against lateral movement, substantially as described.

4. The combination with a frame, of a reciprocating bed thereon, said frame and said bed having opposed guides at their opposite side edges provided with grooves in their upper and lower faces respectively, two sets of bearing balls arranged in said grooves, spacing bars for said balls slidably mounted on said bed guides, cylinder brackets fixed to said frame and a cylinder journaled in said brackets and engaging said bed, said grooves having cylindrical central portions and flaring side walls and coöperating with said balls to center said bed and hold the same against lateral movement.

5. The combination with a frame, of a reciprocating bed thereon, said frame and said bed having opposed guides at their opposite side edges provided with grooves in their upper and lower faces respectively, two sets of bearing balls arranged in said grooves, spacing bars for said balls slidably mounted on said bed guides, cylinder brackets fixed to said frame, a cylinder journaled in said brackets and engaging said bed, said bed having a central bearing guide provided with a flat horizontal working face and a bearing roller journaled on said frame beneath said cylinder and engaging said bearing guide, the grooves of said guides at the side edges of said frame and bed having flaring side walls and coöperating with said balls to center the bed and hold the same against lateral movement, substantially as described.

6. The combination with a frame, of a reciprocating bed thereon, said frame and said bed having opposed guides at their opposite side edges provided with grooves in their upper and lower faces respectively, two sets of bearing balls arranged in said grooves, spacing bars for said balls slidably mounted on said bed guides, cylinder brackets fixed to said frame, a cylinder journaled in said brackets and engaging said bed, said guide grooves having cylindrical central portions and flaring side walls and coöperating with said balls to center the bed and hold the same against lateral movement, and means for vertically adjusting said cylinder, substantially as described.

7. The combination with a frame, of a horizontally reciprocating bed thereon, said frame and said bed having opposed guides at their opposite side edges provided with grooves in their upper and lower faces respectively, two sets of bearing balls arranged in said grooves, spacing bars for said balls slidably mounted on said bed guides, cylinder brackets fixed to said frame, and a cylinder journaled in said brackets above said bed, said bed having bearing guide flanges at its side edges provided with flat horizontal working faces at their upper edges and said cylinder having cylindrical guide flanges engaging the guide flanges of said bed and coöperating with said bearing balls to center the bed and hold the same against lateral movement, substantially as described.

ABRAHAM T. H. BROWER.

Copies of this patent may be obtained for five cents each, by addressing the "Commissioner of Patents, Washington, D. C."